(No Model.)

G. F. SIMONDS.
BALL BEARING.

No. 449,960. Patented Apr. 7, 1891.

Witnesses
Robert Everett
Geo. W. Rea

Inventor:
George F. Simonds.
By James L. Norris
Atty.

UNITED STATES PATENT OFFICE.

GEORGE F. SIMONDS, OF FITCHBURG, MASSACHUSETTS.

BALL-BEARING.

SPECIFICATION forming part of Letters Patent No. 449,960, dated April 7, 1891.

Application filed November 15, 1890. Serial No. 371,558. (No model.)

*To all whom it may concern:*

Be it known that I, GEORGE FREDERICK SIMONDS, a citizen of the United States, residing at Fitchburg, in the county of Worcester and State of Massachusetts, have invented new and useful Improvements in Ball-Bearings, of which the following is a specification.

My invention relates to ball-bearings for railway-car axles, principally, though applicable also to bearings for shafting.

The invention consists in the combination, with an axle or a shaft and its boxing or supports, of spherical rollers or balls adapted to revolve freely in all directions and arranged to take the radial pressure or weight of the axle or shaft, a cage for retaining said balls and in which they are removable in a body, and spherical rollers or balls arranged and supported at the end of the axle intermediate said axle end and the cap or thrust plate of the axle-boxing in such a manner as to receive and distribute the end-thrust of the axle or shaft.

Figure 1:
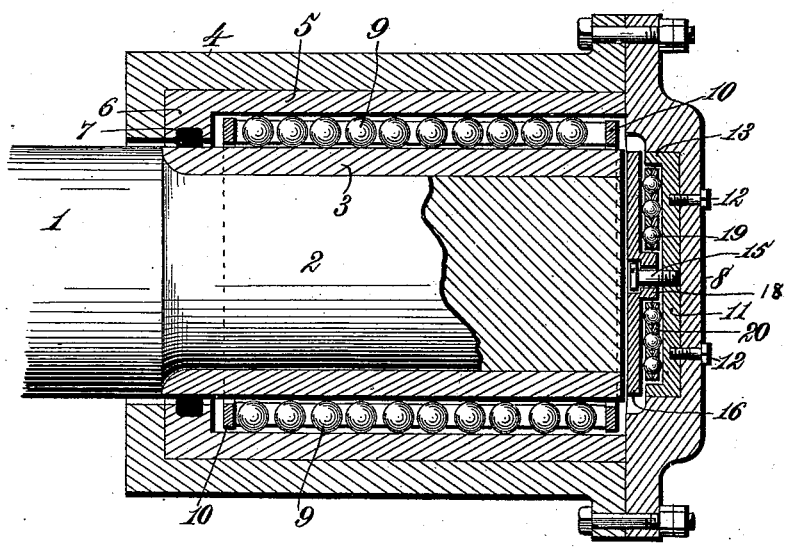
Figure 2:
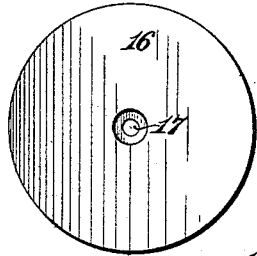
Figure 3:
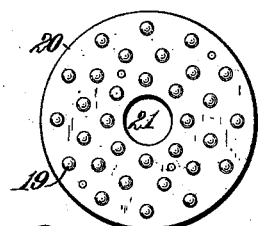
Figure 4:
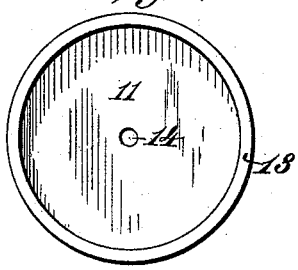
Figure 5:
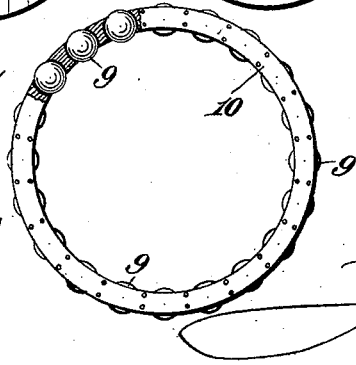

In the annexed drawings, Figure 1 is a sectional elevation illustrating an application of my improved ball-bearing to a car-axle for the purpose of taking the radial and end thrust. Fig. 2 is a side elevation of a centrally-perforated rotatable disk forming part of a casing for inclosing the series of spherical rollers or balls for taking the end-thrust of a car-axle or shaft. Fig. 3 is a side elevation of a cage and inclosed concentric series of spherical rollers or balls for taking end-thrust. Fig. 4 is a side elevation of a flanged and centrally-perforated disk that forms part of the casing for inclosing the spherical rollers or balls that take the end-thrust of the shaft or axle. Fig. 5 is a sectional end elevation of the annular cage and confined balls for sustaining radial pressure or weight.

Referring to the drawings, the numeral 1 designates a car-axle, and 2 the axle-spindle. On the spindle 2 is fixed a sleeve 3, preferably of hardened or tempered metal, said sleeve being secured to the axle, so as to rotate therewith.

The axle box or boxing 4 is secured to the car-truck in any usual or well-known manner, and in this box is placed a sleeve 5, preferably of hardened or tempered metal and having an inward-projecting flange 6 at one end. The edge of the flange 6 is preferably grooved to receive an annular packing 7 of any suitable material arranged to bear on the inner sleeve 3, and effectually exclude dust, moisture, and foreign substances, as shown in Fig. 1, while the other end of the boxing is closed by a cap 8, secured in any suitable or convenient manner.

For the purpose of taking the radial pressure of the car-axle I place between the inner sleeve 3 and outer sleeve 5 the parallel annular series of spherical rollers or balls 9, and in order to facilitate the placing and removal of these rollers or balls all together I prefer to confine them in a cage 10 of the character described and claimed in an application, Serial No. 367,995, filed by me October 13, 1890. By means of the annular cage 10 the spherical rollers or balls 9 can be readily removed and replaced in a body, and as the balls or spherical rollers revolve freely in all directions and are allowed free lateral play in said cage, as shown in Fig. 1, it is obvious that the friction will be greatly diminished and the wear so distributed that replacement of the balls or contiguous parts will be seldom necessary. The cap 8, which also serves as a thrust-plate, is recessed internally opposite the end of the axle to receive a flanged disk 11, Figs. 1 and 4, which is preferably made from hardened or tempered metal, and secured to the cap 8 by screw-bolts 12 or otherwise. The disk 11 is provided with a flange 13, and has a central perforation 14 to receive one end of a bolt 15, which serves as a pivot or journal for a rotatable disk 16, mounted thereon, as shown in Fig. 1. The rotatable disk 16, Fig. 2, is provided centrally with a countersunk perforation 17, to engage the head of the pivot-bolt 15, and said disk has a hub 18, that surrounds the unthreaded part of the bolt-shank, as shown in Fig. 1, and is free to turn thereon. The plane hardened surfaces or disks 11 and 16 form a casing for spherical rollers or balls 19 to take the end-thrust of the shaft or axle 1, and to facilitate the placing and removal of these rollers or balls in a body they are preferably confined in a cage 20, Figs. 1 and 3, in the manner described in my hereinbefore-mentioned application, Serial No. 367,995. The disks 11 and 16 are preferably made of hardened or tempered metal.

By referring to Figs. 1 and 3 it will be seen that the cage 20 is of annular form, having a central opening 21 that permits it to be supported loosely on the hub 18 between the disks 11 and 16, or independent thereof, and so enable the spherical rollers or balls 19 to take up and distribute the end-thrust of the car-axle. The rollers or balls, being confined in a cage, can be readily removed and replaced by detaching the cap 8 and then taking off the rotatable disk 16, that forms part of the cage-casing.

While I have only shown my invention as applied to a car-axle it will be apparent that it is also readily applicable to shafting and other rotating parts where there is end-thrust as well as radial pressure or weight to be sustained, and it will be seen that by placing the spherical rollers or balls 19, for receiving end-thrust, between hardened plane surfaces at the end of and in line with the axle or shaft, the expense and other objections incident to providing collars or annular shoulders on the axle or shaft are obviated.

In another application, Serial No. 376,291, filed December 30, 1890, I have shown and described a ball-bearing for taking end-thrust, and comprising two hardened plane surfaces, an interposed cage, and spherical rollers or balls retained in said cage and adapted to revolve on said plane surfaces, the said cage and hardened plane surfaces being held together and all removable in a body; and I therefore do not make any claim to such construction in this application.

What I claim as my invention is—

In a ball-bearing, the combination, with an axle or shaft, and the boxing of said axle or shaft, of spherical rollers or balls adapted to revolve freely in all directions, and arranged to take the radial pressure or weight of the axle or shaft, a cage for retaining said balls and in which they are removable in a body, and spherical rollers or balls supported at the end of the axle or shaft to take the end-thrust thereof, substantially as described.

In testimony whereof I have hereunto set my hand in the presence of two subscribing witnesses.

GEORGE F. SIMONDS.

Witnesses:
JAMES A. RUTHERFORD,
HOWARD M. NORRIS.